United States Patent [19]

Whiteford

[11] Patent Number: 5,020,232

[45] Date of Patent: Jun. 4, 1991

[54] ILLUMINATED LEVEL

[76] Inventor: Carlton L. Whiteford, 3 High Point Rd., Westport, Conn. 06880

[21] Appl. No.: 508,802

[22] Filed: Apr. 12, 1990

[51] Int. Cl.$^5$ .............................................. G01C 9/32
[52] U.S. Cl. ...................................... 33/348.2; 33/379
[58] Field of Search ....................... 33/348, 348.2, 379

[56] References Cited

U.S. PATENT DOCUMENTS

| 970,729 | 9/1910 | Lingle | 33/383 |
| 3,166,855 | 1/1965 | Erritt | 33/348 |
| 3,584,212 | 6/1971 | Hansen | 33/348.2 |

FOREIGN PATENT DOCUMENTS 969880  5/1950  France ................................. 33/384

Primary Examiner—Harry N. Haroian
Attorney, Agent, or Firm—Spencer E. Olson

[57] ABSTRACT

The bubble vials of a carpenter's level are individually illuminated by a respective light emitting diode (LED) energized from a battery supported within the body of the level. Charge on the batteries is maintained by one or more solar cells mounted on an exterior surface of the body, and the LED's are energized by a control circuit including a normally open manually actuable switch and a pair of mercury switches supported within the body at different fixed orientations relative thereto such that one of them closes when the body is horizontally oriented to apply voltage to the LED for the horizontal bubble vial, and the other closes when the body of the level is vertically oriented and connects the battery to the LED for the bubble vials of the plumbing levels. Thus, the circuit automatically illuminates only the bubble vial, or vials, that need to be illuminated in order to observe the position of the bubble for the orientation selected by the user.

8 Claims, 1 Drawing Sheet

U.S. Patent  June 4, 1991  5,020,232
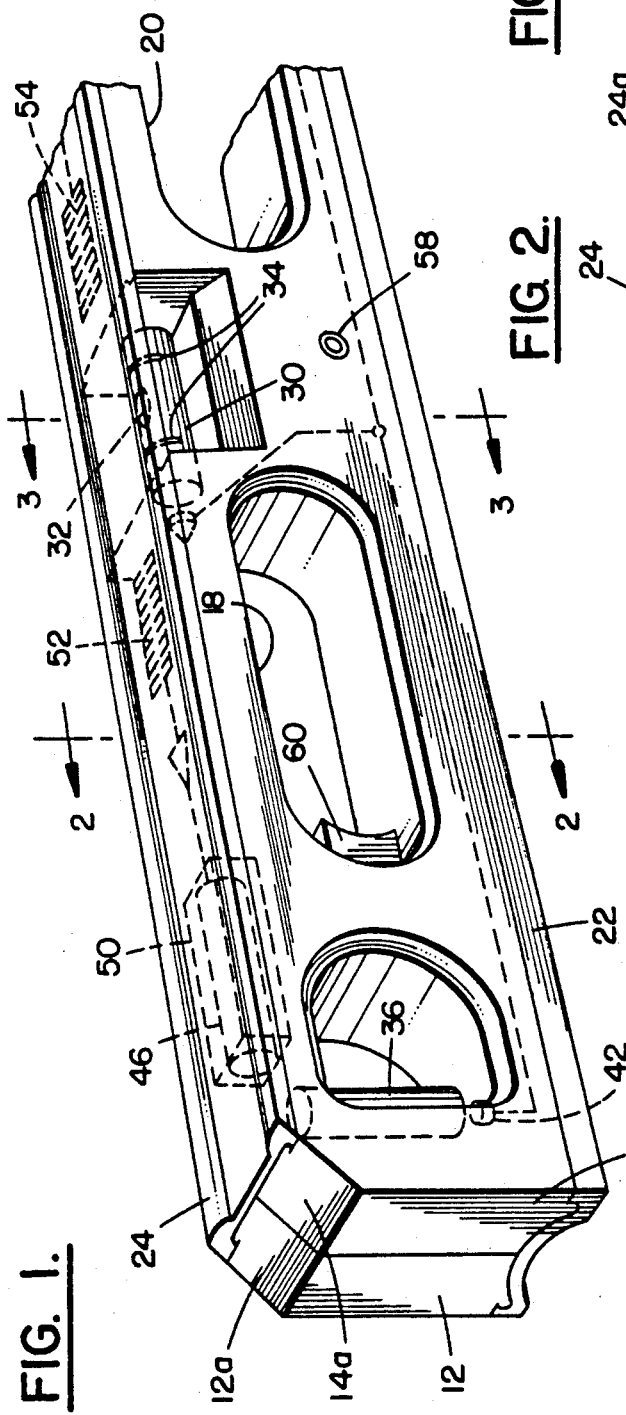
FIG. 1.
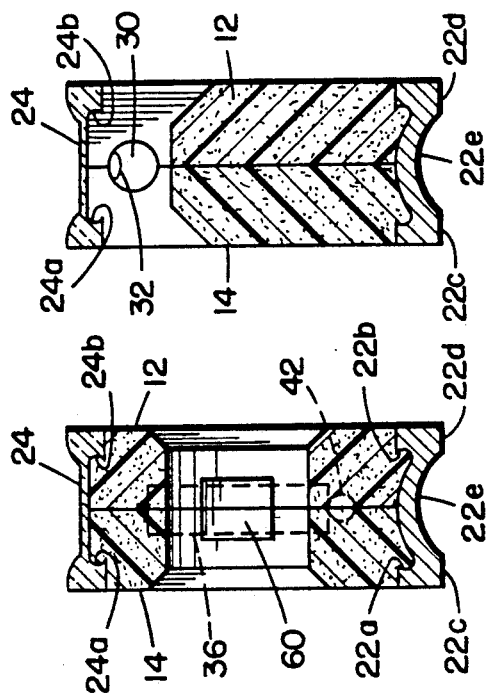
FIG. 2.
FIG. 3.
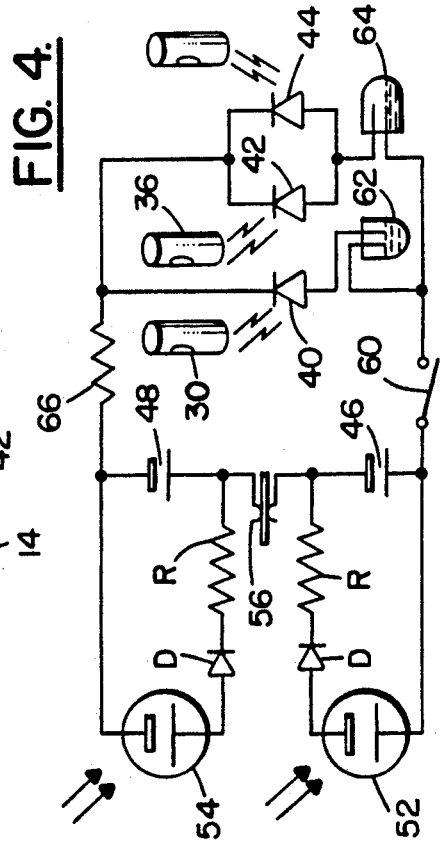
FIG. 4.

ILLUMINATED LEVEL

BACKGROUND OF THE INVENTION

This invention relates generally to tools and instruments and, more particularly, to instruments known as a spirit or carpenter's level.

The carpenter's level, long used by carpenter's, bricklayers and others in the building trades for finding a horizontal level or plane, consists of an elongate body, typically formed of wood or extruded metal such as aluminum, which supports three spirit levels. Each level serves to find a horizontal line or plane by means of a bubble in a non-freezing liquid, usually mineral spirits, that shows adjustment of the horizontal by movement of the bubble to the center of a glass tube that is slightly bowed up from the horizontal longitudinally. The vial of a first level is mounted with its long axis parallel to the longitudinal axis of the body, and two additional levels are mounted near the ends of the body with their long axes oriented perpendicularly to the first. The accuracy with which a horizontal or vertical plane can be determined is critically dependent on the accuracy at which the bubble is centered between transverse lines etched or painted on the glass vial which, of course, is dependent on the visibility of such lines and the outline of the bubble itself. While the position of the bubble can readily be seen under normal lighting conditions, it becomes difficult to see on a heavily clouded day, or at dusk, or in poorly lighted spaces. That is to say, the conventional carpenter's level can be effectively used only in relatively well-lighted environments and, accordingly can put constraints on the times and places craftsmen such as carpenters and bricklayers are able to work efficiently. Since only the bubble and the transverse lines on the vial need to be observed to locate the center position of the bubble, the use of the level could be greatly expanded, including to night time use, by illuminating the bubble vial.

It is a primary object of the present invention to provide a carpenter's level having selectively illuminated spirit levels.

Another object of the invention is to provide a carpenter's level having self-contained means for automatically illuminating either the horizontal spirit level or the plumbing spirit levels in dependence on the orientation of the level.

Still another object of the invention is to provide a carpenter's level of the character described having a self-contained long-life energy source for illuminating the spirit levels.

SUMMARY OF THE INVENTION

Briefly, each of the bubble vials of a carpenter's level is illuminated by a suitable light source, such as a light-emitting diode (LED) disposed adjacent one end thereof, the light source being energized from a rechargeable battery supported within the body of the level. The battery charge is maintained by one or more solar cells mounted on an exterior surface of the body of the level so as to deliver charging current to the battery during daylight hours. The circuit for energizing the light sources includes a manually-actuable on-off switch, preferably positioned on the body to be switched OFF when the level is hung on a hook, for example, and a pair of orientation-dependent switches, such as a simple mercury switch, supported at different orientations within the body such that one of them closes when the level is positioned horizontally to apply voltage across the light for the horizontal bubble vial, and the other connects the battery across the lights for the bubble vials of the plumbing levels when the body is vertically oriented. That is, the circuit is operative to automatically illuminate only the bubble vial or vials that need to be illuminated to observe the position of the bubble for the orientation selected by the user.

Other objects, features and advantages of the invention, and a better understanding of its construction and operation, will be had from the following detailed description, taken in conjunction with the accompanying drawings.

BRIEF DESCRIPTION OF THE DRAWINGS

FIG. 1 is a fragmentary perspective view of a level constructed in accordance with the invention;

FIG. 2 is an elevation cross-section taken along line 2—2 of FIG. 1;

FIG. 3 is an elevation cross-section taken along line 3—3 of FIG. 1; and

FIG. 4 is a schematic diagram of a circuit contained within the body of the level for selectively controlling illumination of the bubble vials of the level.

DESCRIPTION OF THE PREFERRED EMBODIMENT

The level according to the invention, slightly more than half of the length of which is shown in FIG. 1, has an elongate body 10 formed of two like planar-shaped shells 12 and 14, preferably formed by injection molding a foam plastic material, such as polyurethane, so as to be free of stress and strains and any tendency to warp or twist. The paired shells have transverse openings therethrough near opposite ends thereof, one of which is visible at 16 in FIG. 1, and a pair of longer transverse openings 18 and 20. The openings 16, 18 and 20 are preferably beveled at their outer ends for convenience of handling the level as well as for esthetic reasons. Shells 12 and 14 are held together in side-by-side relationship along their top and bottom edges with respective elongate strips. At the the edge intended to be placed in contact with a plane to be leveled or plumbed, they are secured by a metal strip 22, preferably extruded from aluminum and formed with turned in dovetails 22a, 22b which engage the foam material and firmly hold the two shells together. The outer surface of the extrusion has planar areas 22c and 22d disposed along the edges in a common plane for placement on a flat surface, and a curved surface 22e therebetween to facilitate placement of the level on a pipe or other structure of circular shape. Shells 12 and 14 are held together along their upper edges by an elongate strip 24 formed of a suitable transparent plastic material, such as by extrusion of polyvinylchloride (PVC), having turned in dovetails 24a and 24b formed along the side edges which project into and firmly engage the foam material. On its upper outer surface strip 24 has a slight ridge along each edge for protecting the flat area between the ridges from being scratched in the event the level is placed upside down on a supporting surface. To remind the user not to use the upper surface for any purpose other than observation, so as to minimize damage to the transparent cover, the upper corners of the shells are mitred as shown at 12a, 14a, and similarly at the other end of the level. The initial deformation of the foamed plastic material by the dovetails 24a and 24b allows the cover to be slid back and forth on the body 10, much like a matchbox cover, while still holding the two shells together, the purpose of which will soon become apparent.

As in conventional levels, a bubble vial 30 of known construction is supported with its long axis parallel to metal strip 22 and to the mating planar surfaces of shells 12 and 14. The vial 30, which may be formed of lucite, is supported at its ends in recesses formed in the walls of a transverse cutout 32 formed in the upper edge of the body at a location equidistant from the ends thereof, to lie immediately below transparent cover 24. Thus, a bubble 32 in the liquid contained in the vial and the usual transverse markings 34 on the vial for locating the bubble, are visible through the transparent cover which, at the same time, protects the bubble vial from physical damage.

A second bubble vial, of the kind just described, is supported within elongate body 10 with its longitudinal axis oriented perpendicularly to the axis of tube 30 and disposed in a vertical plane which contains spirit level 30, in conventional fashion. One such vial is shown at 36 and extends across transverse opening 16; a second bubble vial may be similarly positioned near the other end of the level but may be omitted in the case of very short levels, in which a single plumbing bubble vial would suffice.

Referring now to FIGS. 1 and 4, in the preferred embodiment of the invention bubble vials 30 and 36 (and 36a, if provided at the end of the level not seen in FIG. 1) are illuminated, when energized, by light-emitting diodes (LED) 40, 42 and 44, respectively, each supported adjacent one end of the vial in a small cavity formed in the foam material. Of the many commercially available varieties of LED's those that emit yellow or red light are particularly attractive. The LED's are energized by one or more rechargeable batteries, in this case by two AA or AAA size nickel-cadmium batteries 46 and 48, one of which is shown in FIG. 1 supported in an elongated recess 50 formed in the upper edge of the body 10 near the mitred end. Battery 48 would be disposed in a similar recess near the other end of the level. The described placement of the batteries permits their convenient replacement, if necessary, by simply sliding transparent cover 24 to the left or right the short distance necessary to expose the battery. In order to provide the minimum of about 3.0 volts required to drive the LED's, the two batteries 46 and 48, each delivering a voltage of 1.5 volts when fully charged, are connectable in series across the LED's upon closure of certain switches, to be described presently.

The charge on the batteries is maintained at rated level by charging current delivered thereto, during daylight hours, by respective solar cells 52 and 54 disposed in respective recesses formed in the upper surface of the body 10 so as to be exposed to light through the transparent cover. The solar cells are preferably located at opposite sides of the transverse recess 20, and may take the form of a device commercially available from Solar World, a Division of Colorado Instruments, Inc., Colorado Springs, Colo., under the trademark "Forever Light" consisting of eight individual silicon cells connected in series and having an output of about 4 volts. The device is quite small and can be easily and conveniently accommodated in level bodies of conventional size. The charging circuit for each of the batteries includes a resistor R for limiting the charging current to a safe level and a diode D poled to preclude the flow of current from the battery to the solar cell. To accommodate the relatively short charge retention of nickel-cadmium batteries, which may appear to be "dead" after a few months of display on a store shelf or storage of the level in a dark basement, the circuit includes a connector 56 of conventional design, accessible through a hole 58 in the side of body 10, for receiving an electrode of a known electronic charging device for quickly recharging the batteries.

Batteries 46 and 48 are normally disconnected from the LED's by a normally open switch 60, preferably of the push-on, push-off type and mounted at the end of elongated opening 18 nearest the end of the body. Should the switch happen to be left on when the level is being put away after a period of use, if hung on a peg extending through opening 18 with the switch engaging the peg, the weight of the body 10 will exert sufficient pressure on the switch to turn it off.

With switch 60 closed, one or the other of LED's 40 and 42 (and 44 if present), but never both at the same time, will be energized depending upon the orientation of the longitudinal axis of the body of the level: if it is horizontally oriented, only LED 40 is energized to thereby illuminate bubble vial 30, and if it is vertically oriented, only LED 42 (and 44 if present) is energized to illuminate bubble vial 36 (and, if provided, the correspondingly oriented plumbing bubble vial at the opposite end). This automatic illumination of only the bubble vial required is achieved with a pair of conventional mercury switches 62 and 64 which open and close an electric circuit by tilting a reservoir of liquid mercury, connected in series with LED's 40 and 42, respectively, and a current limiting resistor 66, between the terminals of the series-connected batteries 46 and 48. If provided, LED 44 is connected in parallel with LED 42. Switch 62 is supported in a cavity formed interiorly of body 10 at a fixed orientation relative thereto at which the liquid mercury closes the circuit when the level is horizontally oriented and opens the circuit when the level is at orientations other than substantially horizontal. On the other hand, switch 64 is supported interiorly of the body at a fixed orientation relative thereto at which the mercury closes the circuit when the level is vertically oriented and opens the circuit when the level is oriented other than substantially vertically. Accordingly, it is unnecessary for the user to select, such as by operating an appropriate switch, the bubble vial to be illuminated for the task at hand; rather, the selection is automatic, and illumination of only the bubble vial of immediate interest, thereby reducing battery drain.

As shown in FIG. 1, the conductors which interconnect the solar cells, batteries, switches and LED's, which may be very fine wires because of the low currents involved, are disposed between and maintained in place by the confronting surfaces of shells 12 and 14, whereby the entire system for illuminating the bubble vials, except for the actuating button of switch 60, is self-contained.

It will be evident that in the course of use of the level during daylight hours no current will be drawn from the batteries and the solar cells will, if necessary, be charging the rechargeable batteries. If for any reason the ambient light should become so dim as to make it difficult to see the bubble, the user may turn the circuit on by manual actuation of switch 60, whereupon the correct bubble vial for the operation being performed at the time will automatically be illuminated. Upon completion of the task at hand, in the interest of conserving battery power the circuit would normally be turned off by actuation of switch 60; however, because of the low current drawn by an LED, of the order of 8 to 10 milliamperes, it can be left on for up to a few hours without discharging the batteries beyond a point at which they can be recharged by exposure to an hour of daylight. The power required for intermittently illuminating the bubble tubes is so miniscule compared to the recharging power available during a day of recharging that the likelihood of there being insufficient battery voltage to drive the LED's is extremely remote. Currently available nickel-cadmium batteries can withstand many charge/discharge cycles during their lifetime, and in the present application where the amount of discharge is normally small, can be expected to have a useful life of several years. This coupled with the fact that the solar cells and LED's are solid state devices unlikely to burn out, the overall system has a life expectancy, without replacement of any parts, of up to ten years.

Although the described preferred embodiment utilizes rechargeable batteries and solar cells to recharge them, it will be understood that the feature of automatically illuminating a desired bubble vial in dependence on the orientation of the body of the level can be realized in a system which employs conventional dry cells as a source of potential for energizing the disclosed LED's or, in the alternative, small light bulbs disposed adjacent an end of each bubble tube. Such conventional batteries could, of course, be mounted in the same manner, with the slidable transparent cover providing for convenient replacement. It will also be evident that the principles of the invention can be realized with a more conventional level body made of wood having cavities and passages formed therein, preferably near its external surfaces, for the circuit components and interconnecting conductors. Thus, it is to be understood that the invention is not to be limited to the specific embodiment illustrated here, the intention being to cover by the appended claims all such modifications as fall within their scope.

I claim:

1. A spirit level comprising: an elongate body having a generally rectangular cross-section and parallel top and bottom surfaces, said body comprising firs and second planar shells secured together side-by-side by an elongate metal strip which covers said bottom surface and grips exterior side surfaces of said shells, and by an elongate strip of transparent material which covers said top surface and grips exterior side surfaces of said shells and is slidable back and forth with respect to said body,
   a first bubble vial supported on said body equidistant from its ends near said top surface with its long axis disposed parallel to the bottom surface, and at least a second bubble vial supported within said body near an end thereof with its long axis disposed perpendicular to the long axis of said first bubble vial,
   at least first and second light-emitting diodes supported within said body, each adjacent an end of a respective one of said first and said at least second bubble vial,
   a rechargeable battery disposed in said body for energizing said light-emitting diodes when connected thereto,
   solar cell means disposed in the top surface of said body beneath said transparent strip for exposure to ambient light and electrically connected to said battery for charging the same in response to light incident thereon, and
   circuit means connected across the terminals of said battery including a normally open on/off switch connected in series with an orientation-dependent switch, said orientation-dependent switches each comprising a mercury switch for opening and closing an electric circuit by tilting a reservoir of liquid mercury and being supported within said body at different fixed relative orientations with respect to the body such that when said normally open on/off switch is closed said first orientation-dependent switch, and only said first switch, closes and applies voltage to said first light-emitting diode when said body is horizontally oriented for illuminating only said first bubble vial, and said second orientation-dependent switch, and only said second switch, closes and applies voltage to said second light-emitting diode when said body is approximately vertically oriented for illuminating only said second bubble vial.

2. A spirit level according to claim 1, wherein said solar cells means is supported in said body immediately below said transparent strip for exposure to ambient light, and
   wherein said at least one battery has the shape of a cylinder of fixed length and is removably supported in a cavity formed in said body near an end thereof immediately below said transparent strip to be accessible upon sliding said strip relative to said body by a distance which exceeds said fixed length by a small amount.

3. A spirit level according to claim 1, wherein said shells are formed of foamed plastic material.

4. An illuminated spirit level comprising:
   an elongate body having parallel top and bottom surfaces and exterior body having parallel top and bottom surfaces and exterior side surfaces perpendicular to said top and bottom surfaces, said body comprising a pair of planar-shaped shells and means securing said shells together side-by-side including an elongate strip of transparent material constructed and arranged to cover said top surface and to grip said exterior side surfaces and to be slidable back and forth with respect to said body,
   at least first and second bubble vials disposed in cavities in said body and perpendicular to each other, a long axis of each of said vials being disposed in a plane parallel to said exterior side surfaces,
   at least first and second light-emitting diodes disposed in said body in association with a respective bubble vial for illuminating the same when energized,
   a rechargeable battery disposed in said body for energizing said light-emitting diodes when connected thereto,
   circuit means connected across the terminals of said battery including a normally-open on/off switch connected in series with parallel connected first and second paths each comprising a respective light-emitting diode and an orientation-dependent mercury switch for opening and closing an electric circuit by tilting a reservoir of mercury, said mercury switches being supported within said body at different fixed orientations with respect to the body such that only the mercury switch in said first path closes an electric circuit to energize the first light-emitting diode when said body is horizontally oriented and only the mercury switch in the second path closes an electric circuit to energize the second light-emitting diode when said body is vertically oriented, and solar cell means supported in the top surface of said body beneath said transparent strip for exposure to ambient light and electrically connected to said battery for charging the battery in response to light incident thereon.

5. An illuminated spirit level according to claim 4, wherein said battery is removably supported in a cavity formed in the top surface of said body near an end thereof to be accessible upon sliding said transparent strip relative to the body by a distance sufficient to expose the cavity.

6. An illuminated spirit level according to claim 4, wherein said shells are formed of foamed plastic material.

7. An illuminated spirit level comprising:

an elongate body having parallel top and bottom surfaces and exterior side surfaces perpendicular to said top and bottom surfaces, at least first and second bubble vials disposed in cavities in said body and perpendicular to each other, a long axis of each of said vials being disposed in a plane parallel to said exterior side surfaces, at least first and second light-emitting diodes disposed in said body in association with a respective bubble vial for illuminating the same when energized, rechargeable battery means disposed in said body for energizing said light-emitting diodes when connected thereto, solar cell means supported in a cavity formed in the top surface of said body and electrically connected to said battery for charging the battery in response to ambient light incident thereon, an elongate strip of transparent material constructed and arranged to cover the top surface of said body for protecting said solar cell means against mechanical damage and for allowing ambient light to reach said solar cell means, and to be slidable back and forth with respect to said body, and circuit means connected across the terminals of said battery including a normally-open on/off switch connected in series with parallel connected first and second paths each comprising a respective light-emitting diode and an orientation-dependent mercury switch for opening and closing an electric circuit by tilting a reservoir of mercury, said mercury switches being supported within said body at different fixed orientations with respect to the top and bottom surfaces thereof such that only the mercury switch in said first path closes an electric circuit to energize the first light-emitting diode when said body is horizontally oriented and only the mercury switch in the second path closes an electric circuit to energize the second light-emitting diode when said body is vertically oriented.

8. An illuminated spirit level according to claim 7, wherein said battery means is removably supported in a cavity formed in the top surface of said body near an end thereof so as to be accessible upon sliding said strip relative to said body a distance sufficient to expose the cavity.

* * * * *